(12) United States Patent
Piper

(10) Patent No.: US 6,409,110 B1
(45) Date of Patent: Jun. 25, 2002

(54) APPARATUS FOR PROCESSING COMPACTED BIOMASS

(75) Inventor: John E. Piper, Hillerød (DK)

(73) Assignee: Babcock & Wilcox Volund APS, Esbjerg (DK)

( * ) Notice: Subject to any disclaimer, the term of this patent is extended or adjusted under 35 U.S.C. 154(b) by 0 days.

(21) Appl. No.: 09/503,322

(22) Filed: Feb. 14, 2000

(30) Foreign Application Priority Data

Feb. 15, 1999 (EP) .............................................. 99102963

(51) Int. Cl.[7] ................................................. B02C 4/16
(52) U.S. Cl. ........................ 241/236; 241/230; 241/234
(58) Field of Search ................................. 241/230, 234, 241/236

(56) References Cited

U.S. PATENT DOCUMENTS

| | | | | |
|---|---|---|---|---|
| 3,651,755 A | * | 3/1972 | Gati ............................ | 241/230 |
| 4,684,070 A | * | 8/1987 | Dicky ........................ | 241/79.3 |
| 5,362,000 A | * | 11/1994 | Schwelling .................. | 241/159 |
| 5,609,307 A | * | 3/1997 | Rota ............................. | 241/73 |
| 5,647,544 A | * | 7/1997 | Greiner et al. ................. | 241/17 |
| 5,673,864 A | * | 10/1997 | Stevenson et al. .......... | 241/234 |

FOREIGN PATENT DOCUMENTS

| | | | |
|---|---|---|---|
| DE | 3416009 A1 | * | 10/1985 |
| EP | 0 670 107 A | | 9/1995 |
| FR | 2 373 957 A | | 7/1978 |
| FR | 2 423 137 A | | 11/1979 |
| GB | 2 139 079 A | | 11/1984 |
| WO | 89 11786 A | | 12/1989 |

* cited by examiner

Primary Examiner—Allen Ostrager
Assistant Examiner—William Hong
(74) Attorney, Agent, or Firm—Larson & Taylor, PLC

(57) ABSTRACT

An apparatus for processing compacted biomass is provided which include a conveying system forwarding compacted biomass in a controlled manner in a mainly horizontal direction, and first and second rotatable rollers positioned downstream of the conveying system with their axes of rotation generally horizontal and parallel. The first roller is positioned horizontally closer to the conveying system than the second roller. The first and second rollers are rotated in opposite directions with different peripheral speeds and the rollers are provided with teeth-like elements projecting from the outer surfaces to engage the compacted biomass material and to pass the material through a gap formed between the two rollers. The peripheral speed of the second roller is higher than the peripheral speed of the first roller, whereby the material to be processed is fed into the gap in a controlled manner and subjected to a stretching and loosening action in the gap with low energy consumption and high reliability.

9 Claims, 1 Drawing Sheet

APPARATUS FOR PROCESSING COMPACTED BIOMASS

TECHNICAL FIELD

The present invention relates to an apparatus for processing compacted biomass, such as bales of hay, straw or other similar material, into a form which is suitable to be used to fire a furnace. The material may be fed to the furnace from a chute positioned downstream of the processing apparatus by means of a stoker-type feeding mechanism. The compacted biomass is forwarded in the processing apparatus in a controlled manner by a mainly horizontal conveying system and are opened by cutting the strings or other holding means keeping the bales in a compacted state.

BACKGROUND ART

From AU-663,791, on which the preamble of claim 1 is based, it is known to provide an apparatus for processing bales of hay and straw. This apparatus comprises a conveying system of rollers forwarding the bales towards a shredding roller rotated in the same direction but with a relatively high speed compared to the speed of the conveying rollers, and positioned downstream of the conveying rollers. A further roller is positioned downstream of the shredding roller to feed material into the gap between this further roller and the shredding roller, the further roller being rotated in opposite direction compared to the shredding roller, with a lower peripheral speed. The relatively high speed of the shredding roller has a tendency to throw material over and past the further roller in an uncontrolled manner, and the shredding roller has, due to the higher peripheral speed, a tendency to grip more material from the bale than can be transported down between the counter-rotating rollers.

DISCLOSURE OF THE INVENTION

Based on this prior art, it is the object of the present invention to provide an apparatus of this kind which is able to process compacted biomass in an efficient way, reducing the required energy for the processing and yet delivering a processed material sufficiently loosened e.g. to be fed into a furnace by means of a stoker-type feeding system with a screw conveyor or a reciprocating piston.

This is achieved by an apparatus for processing compacted biomass, the apparatus comprising: a conveying system, including controllable drive means, for forwarding compacted biomass in a controlled manner in a mainly horizontal direction; a first rotatable roller and a second rotatable roller positioned downstream of the conveying system, said first and second rollers having their axes of rotation extending generally horizontal and parallel to each other, the first roller being positioned horizontally closer to the conveying system than the second roller so as to first receive the compacted biomass, the first and second rollers being rotated in opposite directions with different peripheral speeds and the rollers being provided with teeth-like elements projecting from the outer surfaces thereof to engage the compacted biomass and passing the biomass through a gap formed between the two rollers, the peripheral speed of the second roller being higher than the peripheral speed of the first roller. The two rollers provide a positive feeding of the material through the gap between the rollers, the first roller controls the speed of feeding into the gap and the faster rotating second roller ensures that all material fed into the gap is quickly removed. The different peripheral speed of the two rollers provides a stretching and thereby loosening of the material with a low energy consumption and with a high reliability. Preferred embodiments are discussed below.

BRIEF DESCRIPTION OF THE DRAWING

In the following detailed part of the description, the invention will be explained with reference to an exemplary preferred embodiment thereof shown in the drawings, in which.

DESCRIPTION OF THE PREFERRED EMBODIMENT

Figure 1:
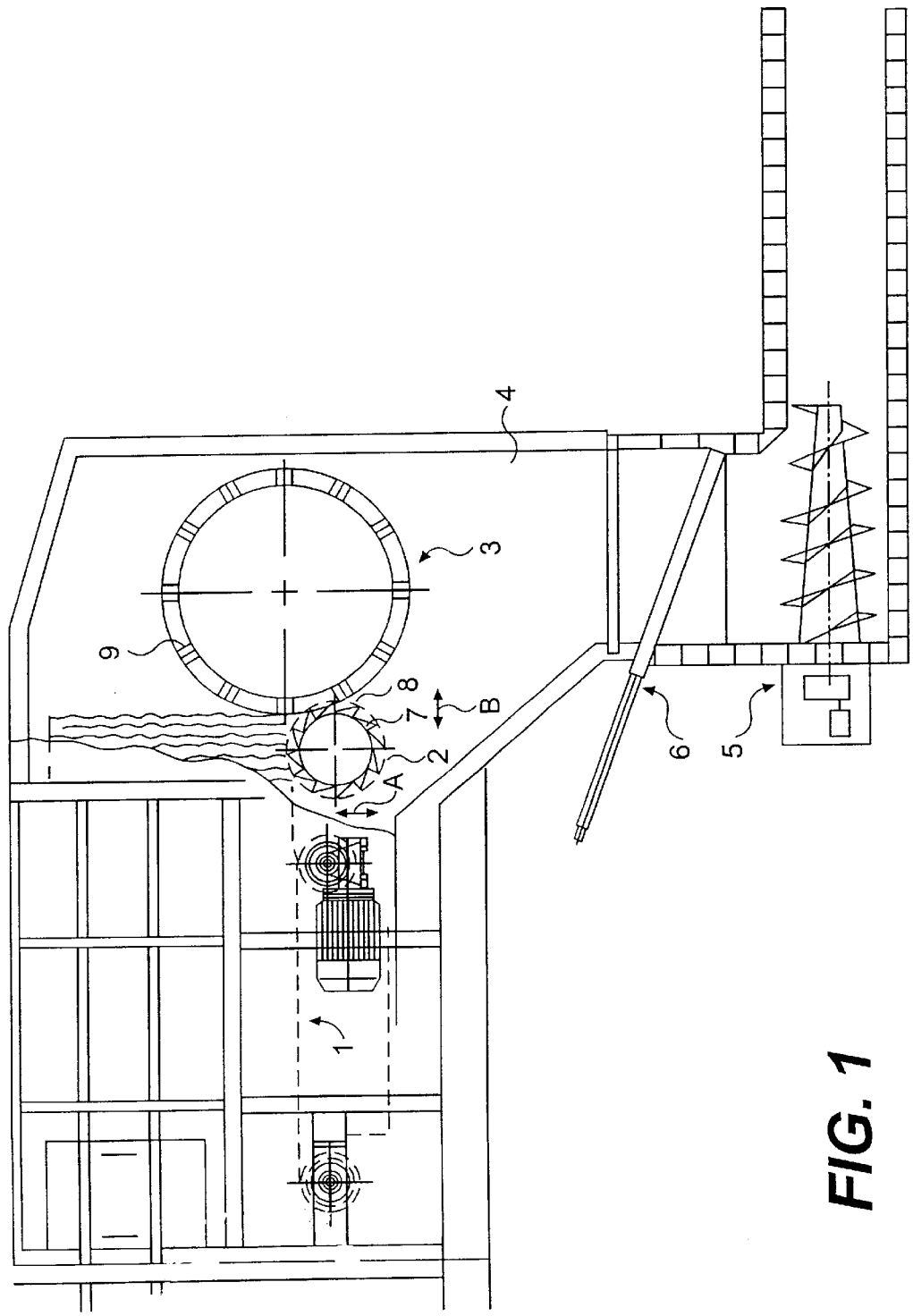
FIG. 1 shows a schematic side view of the essential parts of an apparatus in accordance with the invention.

The apparatus shown in FIG. 1 comprises a conveying system 1 forwarding the bales of compacted biomass in a controlled manner towards the first 2 and second 3 rotatable roller positioned downstream of the conveying system 1. Below the two rollers 2, 3 is a chute 4 for receiving the processed material, said chute being provided with a screw conveyor 5 positioned at the bottom of the chute to feed the processed biomass material into a furnace (not shown). In the shown embodiment, the chute is provided with a sliding gate 6 providing a possibility of closing off the connection between the furnace and the processing apparatus in order to prevent a fire from propagating into the processing system from the furnace.

The apparatus shown in FIG. 1 functions in the following way: Compacted biomass, e.g. bales of hay or straw, is fed into the apparatus and forwarded in a controlled manner in a horizontal direction by the conveying system 1. The strings or similar holding means keeping the bales in a compacted state are cut up in the conveying system 1, whereby the bales are opened. At the front end of a bale forwarded on the conveying system 1, the first roller 2 engages the bottom part of the bale with its teeth 7 and feeds the gripped material into the gap 8 between the two rollers 2, 3. In the gap 8 between the two rollers 2, 3, the material is engaged by the teeth-like elements 9 on the second roller 3 and due to the higher peripheral speed of the second roller 3 the material is stretched and loosened in the gap 8 between the two rollers 2, 3. When leaving the gap 8, the material is dropped into the chute 4 and falls down to the screw conveyor 5 feeding the furnace.

In the embodiment shown in FIG. 1, the first roller 2 has a smaller diameter than the second roller 3 and accordingly, the different peripheral speed of the two rollers can be provided by rotating the two rollers 2, 3 with the same rotational speed, i.e. same number of revolutions per minute. In FIG. 1, the first roller 2 is shown positioned with its teeth-like elements 7 protruding upwardly above the bale supporting surface of the conveying system 1 so that the teeth-like elements 7 can grip the bottom part of the bale material. In this respect the surface supporting the bale material in the conveying system 1 may be provided with slits for the teeth-like elements 7 in order to support the bale material at the point where the teeth-like elements 7 grip the material.

The teeth-like elements 7, 9 on the two rollers 2, 3 are positioned in a staggered manner in the axial direction of the two rollers in order to be able to pass through the gap 8 between the two rollers without interference between the teeth-like elements 7, 9.

It may be advantageous to be able to adjust the relative vertical position of the roller 2 and the supporting surface of the conveying system 1, in order to control the gripping of the bale material by the teeth-like elements 7 on the roller 2. This is indicated by arrow A in the drawings. Furthermore, the distance between the two rollers 2, 3 may advantageously be adjustable as indicated by arrow B, in order to control the processing of the material in the gap 8 between the two rollers 2, 3. Furthermore, the two rollers 2, 3 may be supported in their positions in such a way that if a stone or similar material is contained in the bale material, the rollers may move away from each other against the force of a spring or similar element, in order to allow passage of such material through the gap 8 between the two rollers 2, 3. With the position of the two rollers shown in FIG. 1, material of the bales which has not been gripped by the first roller 2 and passed to the gap 8 between the two rollers 2, 3 will eventually reach the teeth-like elements 9 on the second roller 3 and be gripped by these and thereby forced into the gap 8 between the two rollers. One axial row of the teeth-like elements 7 on the first roller 2 may project further from the surface of the roller than the rest of the teeth-like elements 7, whereby said roller may be positioned in such a way that only those further projecting teeth-like elements will actually grip material from the bale of compacted biomass forwarded on the conveying system 1, the smaller teeth-like elements 7 not projecting above the supporting surface of said conveying system 1. In this way, the first roller 2 could in connection with square bales of hay or straw grip one bale stroke of hay or straw for each revolution of the roller 2, the bale stroke being forwarded through the gap 8 in a controlled manner by the smaller teeth-like elements 7 on the roller 2.

The main processing of the material is performed by the teeth-like elements 9 on the second roller 3 rotating at a higher peripheral speed than the teeth-like elements 7 on the first roller 2, using the teeth-like elements 7 on the first roller 2 as a moving retainer moving at a slower speed than the teeth-like elements 9 on the surface of the second roller 3.

The processing of the material will naturally cause wear on the teeth-like elemets 7, 9 and the wear parts on these teeth-like elements 7, 9 may be replaceable, shown for the teeth-like elements 9 by the front part being a separate part of these teeth-like elements which are screwed onto a fixed backpart.

LIST OF REFERENCE NUMERALS

1 conveying system
2 first roller
3 second roller
4 chute
5 screw conveyor
6 sliding damper
7 teeth-like elements
8 gap
9 teeth-like elements

What is claimed is:

1. Apparatus for processing compacted biomass, said apparatus comprising a conveying system, including controllable drive means, for forwarding compacted biomass in a controlled manner in a mainly horizontal direction, a first rotatable roller and a second rotatable roller positioned downstream of the conveying system, said first and second rollers having their axes of rotation extending generally horizontal and parallel to each other, the first roller being positioned horizontally closer to the conveying system than the second roller so as to first receive the compacted biomass, said first and second rollers being rotated in opposite directions with different peripheral speeds and the rollers being provided with teeth-like elements projecting from outer surfaces thereof to engage the compacted biomass and passing the biomass through a gap formed between the two rollers, the peripheral speed of the second roller being higher than the peripheral speed of the first roller.

2. Apparatus in accordance with claim 1, wherein the first roller is positioned to engage a front end portion of the compacted biomass forwarded on the conveying system at a bottom part of said compacted biomass, thereby gripping material from the compacted biomass and feeding the gripped material into the gap between the two rollers.

3. Apparatus in accordance with claim 2, wherein the first roller comprises at least one axial row of teeth-like elements projecting further from the surface of said roller than the rest of the teeth-like elements on said roller.

4. Apparatus in accordance with claim 1, wherein the second roller is positioned with the axis of rotation thereof at a higher level than the axis of rotation of the first roller.

5. Apparatus in accordance with claim 1, wherein the diameter of the second roller is larger than the diameter of the first roller.

6. Apparatus in accordance with claim 1, wherein at least one of the rollers is movable away from the other roller against the force of a biasing element, in order to allow passage of material contained in the compacted biomass.

7. Apparatus in accordance with claim 1, wherein at least some of the teeth-like elements comprise replaceable wear parts.

8. Apparatus in accordance with claim 1, wherein the first roller has a surface and the teeth-like elements of the first roller have a front face forming an angle greater than 90° with the surface of said first roller.

9. Apparatus in accordance with claim 1, wherein the second roller has a surface and the teeth-like elements of the second roller have a front face forming an angle smaller than 120° with the surface of said second roller.

* * * * *